(12) United States Patent
Lamm

(10) Patent No.: US 6,504,332 B1
(45) Date of Patent: Jan. 7, 2003

(54) METHOD FOR LIMITING THE CLOSING FORCE OF MOVABLE COMPONENTS

(76) Inventor: Hubert Lamm, Hirtel 11, 77876 Kappelrodeck (DE)

(*) Notice: Subject to any disclaimer, the term of this patent is extended or adjusted under 35 U.S.C. 154(b) by 0 days.

(21) Appl. No.: 09/830,834

(22) PCT Filed: Jul. 29, 2000

(86) PCT No.: PCT/DE00/02511
§ 371 (c)(1),
(2), (4) Date: Jun. 25, 2001

(87) PCT Pub. No.: WO01/21920
PCT Pub. Date: Mar. 29, 2001

(30) Foreign Application Priority Data

Sep. 1, 1999 (DE) .......................................... 199 41 475

(51) Int. Cl.$^7$ .............................. H02P 3/00; H02P 7/00
(52) U.S. Cl. ....................... 318/445; 318/461; 318/466; 318/468; 318/566
(58) Field of Search ................................. 318/560, 565, 318/566, 364, 366, 445, 461, 466–469

(56) References Cited

U.S. PATENT DOCUMENTS

| | | | | |
|---|---|---|---|---|
| 5,436,539 A | * | 7/1995 | Wrenbeck et al. | 318/467 |
| 6,002,227 A | * | 12/1999 | Lamm et al. | 318/468 |
| 6,064,165 A | * | 5/2000 | Boisvert et al. | 318/466 |
| 6,208,101 B1 | * | 3/2001 | Seeberger et al. | 318/466 |
| 6,265,843 B1 | * | 7/2001 | West et al. | 318/461 |
| 6,347,482 B1 | * | 2/2002 | Takiguchi et al. | 318/466 |
| 6,373,214 B1 | * | 4/2002 | Hormann | 318/466 |

FOREIGN PATENT DOCUMENTS

| | | |
|---|---|---|
| DE | 29 26 938 A | 1/1981 |
| DE | 43 21 264 A | 1/1994 |
| DE | 195 11 581 A | 10/1995 |
| DE | 195 14 257 C | 7/1996 |
| DE | 196 18 219 A | 11/1997 |
| DE | 196 38 781 A | 3/1998 |
| EP | 0 640 740 A | 3/1995 |

OTHER PUBLICATIONS

Database WPI Section PQ, Week 199940, Derwent Publications Ltd., London, GB; Class Q12, AN 1999–474992 XP002901381 & JP 11 200705 A (Yazaki Corp.), Jul. 27, 1999.

* cited by examiner

Primary Examiner—Marlon T. Fletcher

(57) ABSTRACT

A method for limiting the closing force of movable components (16), in particular windows and sliding roofs in vehicles is provided. The windows and roofs are powered by an electric motor driven servo drive. The inventive method comprises at least the following steps: determination of the actual motor rotation speed n by evaluating periodic signals from a sensor connected to a servo drive; calculation of a typical parameter on which reflects a change in motor rotation speed; summation and saving of an actual typical parameter in a sum storage device; starting of a timing device and a threshold sensor, in the event that the summed parameter value totals exceed a parameter threshold value; comparison of an actual threshold value g(t) with an actual, summed parameter value; triggering of a mechanism to limit the closing force and resetting of the timing device and the summed value storage device, if the respective current value of the summed parameters are the same as or equal to or larger than the respective current threshold value g(t); termination of the comparing procedure and resetting of the timing device in addition to the summed value memory, if the respective value of the summed parameter is smaller than the respective current threshold value and is within a predefined tolerance and additionally, a predefined time unit remains constant.

7 Claims, 2 Drawing Sheets

METHOD FOR LIMITING THE CLOSING FORCE OF MOVABLE COMPONENTS

PRIOR ART

The invention relates to a method for limiting the closing force of movable parts, in particular windows and sliding roofs in motor vehicles, according to the preamble to the independent claim.

Many of the previously known methods are essentially based on the fact that a particular measurement quantity that typically changes in the event of a pinch is monitored and when a particular, preset limit value is exceeded, steps are taken to limit the closing force. These typical values are, for example, the speed of a motor driving the movable parts or the current- or power consumption of this motor. Frequently, the limit values for triggering the closing force limitation are also variable and can be adapted, for example, to changing friction conditions or aging processes.

All of these methods, however, have the disadvantage that the limit values are predetermined in a fixed manner independent of the type of objects being pinched. It is therefore impossible to adapt the closing force limitation to objects of a different hardness or softness.

Consequently consideration is also not given to the fact that the dynamics and therefore also the respective pinching forces can be subject to very intense fluctuations depending on the type of object being pinched.

With the method according to the application, the force increases when hard objects are pinched are replicated by springs with relatively high spring ratios of 65 N/mm, for example, and the force increases when soft objects are pinched are replicated by springs with relatively low spring ratios of 10 N/mm, for example. A permissible pinching force of 100 N is already achieved after a very short travel distance when there is a high spring ratio and only after a relatively long travel distance when there is a low spring ratio.

This results in the fact that with a fixed preset value of a speed change as a limit value, when a very hard object is pinched, the drive for adjusting the movable parts must be switched off very rapidly in order not to exceed the preset pinching force. On the other hand, when very soft objects are being pinched, it can take a very long time before a pinch prevention measure is activated.

Thus the current methods do not take different spring ratios into consideration. Depending on the spring ratio, the forces acting on the object being pinched can vary within an extremely wide range. This is a big disadvantage because an optimal limit value can only be matched to one particular spring ratio as a switch-off criterion.

ADVANTAGES OF THE INVENTION

The method according to the invention for limiting the closing force of movable parts, with the features of the main claim, has the advantage that by presetting a time limit value curve, an optimal adaptation to different spring ratios is possible. The limit value curve can be selected so that when hard objects are pinched with a high spring ratio, there is sufficient time to activate a pinch prevention measure. When objects are pinched with a low spring ratio, the drive can be switched off at much lower pinching forces. By presetting a particular limit value curve, an individual limit value can thus be predetermined for each spring ratio.

It is particularly advantageous that the method according to the invention is a two-stage method. In the first stage, the respective current motor speeds n are determined based on periodic signals of a sensor connected to the adjusting drive and based on them, a value $\Delta n$ that is typical for the current change in the motor speed is calculated, summated, and stored in a memory. Naturally there is no strict periodicity for the signals, particularly not if there is a loss in motor speed.

If the summated value $\Sigma \Delta n$ exceeds a threshold value S, then the method transitions into the second stage in which the time meter and the limit value curve transmitter are started. The time meter does not necessarily have to be started, it can also run continuously. The only decisive thing is that the time meter is sent a signal indicating the time at which the second stage is triggered or the limit value curve transmitter is started.

In this second stage, of the system is disposed in a kind of alarm state and the movement process is observed in a differentiated manner according to the other process steps in order to specifically detect pinching situations particularly with regard to the type of objects being pinched. To that end, the current limit values g(t) of the limit value curve transmitter are compared to the values of the current, summated values $\Sigma \Delta n$. It is particularly advantageous that by presetting or starting the time limit value curve g(t), an individual limit value can be preset for each spring ratio because the chronological development of the value $\Sigma \Delta n$ also has a different chronological progression depending on the spring ratio.

The triggering of a measure for limiting the closing force only occurs if the respective current value of the summated value $\Sigma \Delta n$ is equal to or greater than the respective current limit value $g_j(t)$. Then, for example, the drive is switched off or reversed. At the same time, the time meter and the sum memory are reset.

If the respective current values of the summated values $\Sigma \Delta n$ do not reach the respectively current limit values $g_j(t)$ and if the values of the summated values $\Sigma \Delta n$ do not change within a predetermined tolerance $\Delta$ and a predetermined time $\Delta t$, then the comparison is stopped and the time meter and the sum memory are reset. Then it is assumed, namely, that there was no serious expectation of pinching but only a partial sluggishness in the system.

With each resetting of the sum memory and the time meter, the system reverts to the first stage in which there is merely a monitoring of whether the summated value $\Sigma \Delta n$ exceeds a particular threshold value. In order to prevent this excess from occurring automatically after a certain amount of time as a result of the summation, the sum memory must be continuously decremented in this first stage. Naturally, this decrementation has to occur slowly.

Advantageous improvements of the method according to the main claim are possible by means of the measures disclosed in the dependent claims.

It is advantageous if the determination of the respective current motor speeds n is executed based on periodic edge alternations. Such edge alternations are typically produced by a two-pole or multi-pole annular magnet which is mounted on a rotatable axle of the motor. Upon rotation of the axle, signal changes are produced which are detected by a Hall sensor. The respective current motor speed can be determined from the periodic edge alternations, for example by measuring the period duration.

In practice, it has turned out to be particularly advantageous if, for the change in the motor speed $\Delta n$, the difference between a current speed value $n_i$ and an immediately preceding speed value $n_{i-1}$ is calculated. Calculating this difference yields, in a first approximation, the derivative of the motor speed n over the distance traveled by the movable part to be adjusted.

The method according to the invention makes it possible to preset an arbitrary time limit value curve with which a very particular limit value is to be associated with each arbitrary spring ratio. It has turned out to be extremely advantageous if the curve of the limit value g(t) is interpolated from presettable, empirically determined corner points $g_i$. On the one hand, this simplifies the application of the method and on the other hand, a certain flexibility is assured because based on these corner points $g_i$, different functions adapted to the respective system can be plotted through these corner points. Advantageously, the corner points $g_i$ are stored as a table in the limit value curve transmitter.

An additional, very significant advantage is achieved if the limit value curve automatically adapts to changing operating conditions. For example, sluggishness due to aging effects can then be recognized and taken into account.

A current and advantageous measure for limiting the closing force of the adjusting drive is to stop or reverse the adjusting drive or also to move the movable part back into an initial position.

BRIEF DESCRIPTION OF THE DRAWINGS

An exemplary embodiment of a method according to the invention is shown in the drawings and will be explained in detail in the description that follows.

DESCRIPTION OF THE EXEMPLARY EMBODIMENT

Figure 1:
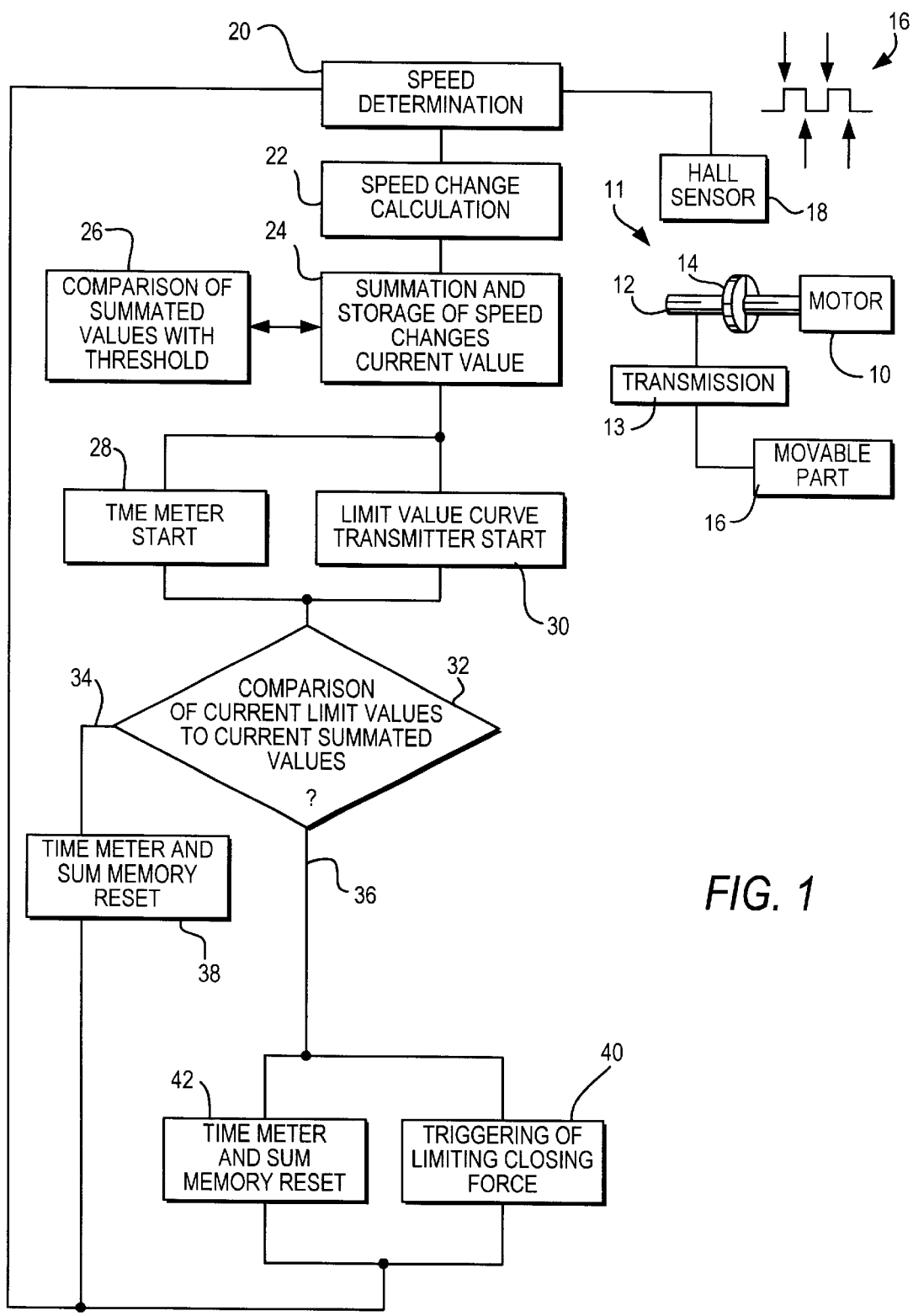
FIG. 1 shows a sequence of the method according to the invention.

The exemplary embodiment of a method according to the invention for limiting the closing force of movable parts shown in FIG. 1 contains schematic depictions of individual parts of an adjusting drive and a flow chart in a number of steps.

A motor 10 of an adjusting drive 11 drives a shaft 12 which is connected via a transmission unit 13 to a movable part 16. A two-pole annular magnet 14 is non-rotatably mounted on the shaft 12 and, upon rotation of the shaft 12, generates periodic edge alternations 16 in a Hall sensor 18.

In a first stage of the method, the speed n of the motor 10 is determined in the process step 20, based on the periodic edge alternations 16 of the Hall sensor 18. In a second process step 22, a value $\Delta n$ that is typical for the current motor speed change is calculated based on the respective current motor speeds n. This calculation yields the difference between a current speed value $n_i$ and an immediately preceding speed value $n_{i-1}$. In the borderline case, this difference calculation can be interpreted as the derivative of the speed over the distance. In an additional process step 24, the respective current values of the speed changes are summated and stored in a sum memory. In process step 26, these summated values $\Sigma \Delta n$ are continuously compared to a threshold value S.

In a speed loss, the value $\Sigma \Delta n$ increases very sharply and exceeds the threshold value S. So that this does not also occur during normal operation, it is necessary to continuously decrement the sum memory since the sum of the derivatives changes continuously and the threshold S can be exceeded even without the existence of a pinching situation. The extent of this continuous decrementation must naturally be adapted to the system.

If the summated speed change $\Delta n$ exceeds the threshold value S, then the second stage of the method is executed in which a time meter is started in step 28 and a limit value curve transmitter is started in step 30. As a result, the time t=0, at which the limit value curve transmitter begins, starts to output a chronological progression of limit values g(t). In step 32, the current limit values $g_j(t)$ are compared to the current summated values $\Sigma \Delta n$.

Depending on this comparison, then either the process path 34 or the process path 36 is taken.

On condition that the sum of the summated motor speed changes $\Sigma \Delta n$ is less than the current limit value $g_j(t)$ and also on condition that the respective current value of the summated values $\Sigma \Delta n$ does not change within a predetermined tolerance $\Delta$ and a predetermined time $\Delta t$, then both the time meter and the sum memory are reset in process step 38. This represents an abort condition which signals the system that there is no acute pinching danger.

If the respective current value of the summated values $\Sigma \Delta n$ is equal to or greater than the respective current limit value $g_j(t)$, then the path 36 is taken in which, in step 40, a measure for limiting closing force is triggered. In this exemplary embodiment, a measure of this kind includes the reversal of the motor and consequently the reversal of the movable parts 16. At the same time, in step 42, the time meter is reset to t=0 and the sum memory is reset.

After the ending of process steps 38 or 42 and 40, the system returns to the process step 20 and the motor speeds are determined anew and the corresponding changes are monitored.

Figure 2:
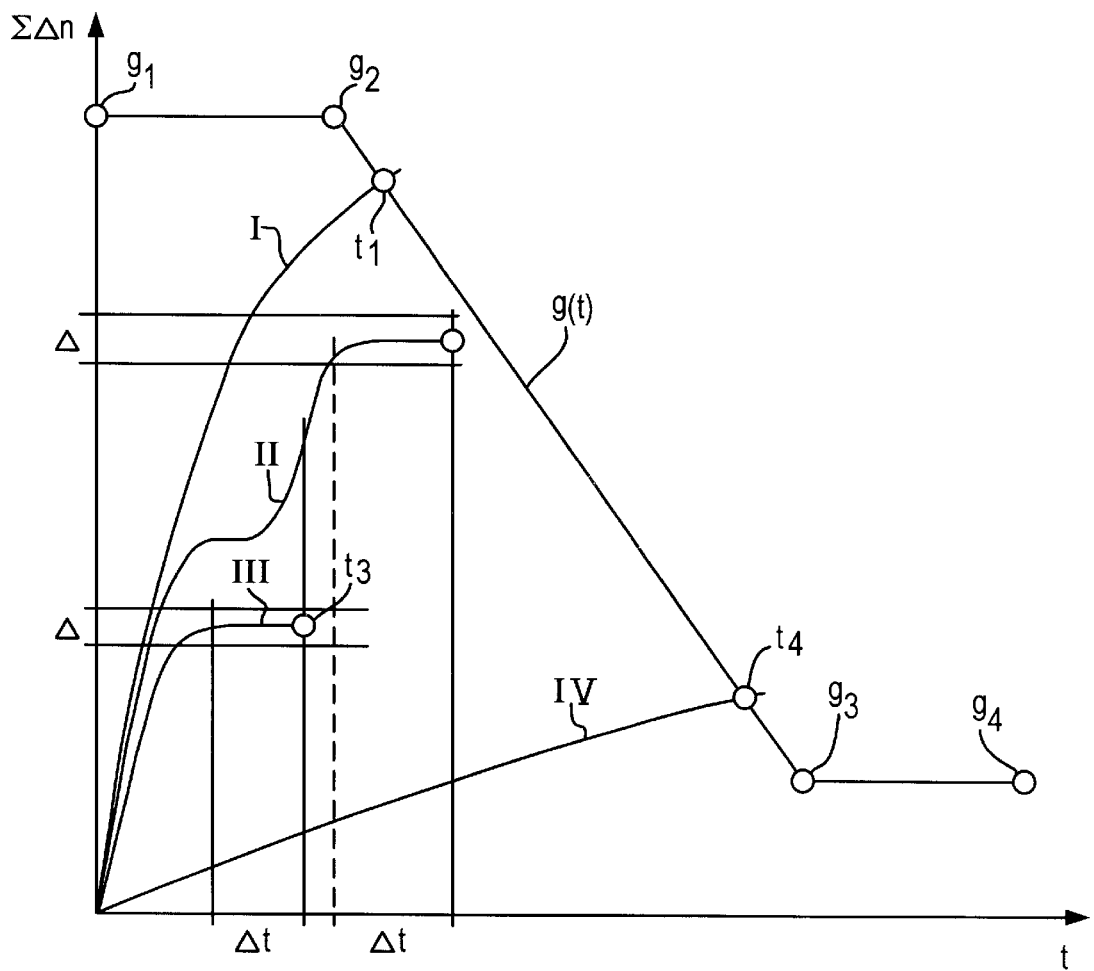
FIG. 2 is a graph which depicts the passage through different process steps with two different spring ratios.

FIG. 2 shows a graph in which the time t is plotted on the x-axis and the sum of the speed changes $\Sigma \Delta n$ is plotted on the y-axis. Various chronological progressions of increases in the summated values $\Sigma \Delta n$ are plotted in the graph, wherein the curves I to III relate to a relatively hard spring ratio and the curve IV relates to a relatively soft spring ratio.

Also shown is a typical limit value curve g(t) which is predetermined by the four different corner points $g_1$ to $g_4$. The chronological progression of the limit value is obtained through interpolation between these four corner points $g_1$ to $g_4$.

The curve I reflects a typical pinching event in which the speed in the motor drops rapidly within a relatively short time, as a result of which the sum of the speed changes $\Sigma \Delta n$ increases very drastically. At time $t_1$, the progression of curve I intersects the limit value curve g(t), which fulfills the condition for triggering the closing force limitation.

At first, the slope of curve II is exactly as steep as the slope of curve I, but then goes through two regions i and ii with very flat slope. The first region i does not fulfill the abort condition of the method according to the invention because the summated value $\Sigma \Delta n$ changes too intensely within the preset time $\Delta t$. As a result, the curve II rises again and transitions into the second very flat region ii. At the end point of the curve at time $t_2$, however, the abort condition is fulfilled; the value of the summated value $\Sigma \Delta n$ does not change more intensely than the tolerance A within the preset time interval $\Delta t$. Therefore an abort occurs at time $t_2$ and the sum memory and the time meter are reset.

In the curve III, which initially has a steep slope similar to the two curves I and II, the abort condition is already fulfilled very early at time $t_3$.

In contrast to the three curves I to III, the curve IV depicts a typical progression for a soft spring. Characteristic of this is the relatively flat slope and the nevertheless still relatively early time $t_4$ at which the curve IV intersects the limit value curve g(t) and therefore fulfills the triggering condition for the closing force limitation.

Depending on the limit value curve g(t), in particular as a result of the choice of the slope between the points $g_2$ and $g_3$, different spring ratios can be associated with different triggering conditions and pinching forces. The dynamics of the closing force limitation can also be matched to different spring ratios.

What is claimed is:

1. A method for limiting the closing force of movable parts (16), in particular windows and sliding roofs in motor vehicles, which are driven by an electromotive adjusting drive (11), with at least the following steps:

determination of the respective current motor speeds n based on periodic signals of a sensor (18) connected to the adjusting drive (11), calculation of a respective value $\Delta n$ that is typical for the current change in the motor speeds, summation and storage of the respective current typical value $\Delta n$ in a sum memory (24), starting of a time meter (28) and a limit value curve transmitter (30) when the summated value $\Sigma \Delta n$ exceeds a threshold value, comparison of the current limit value g(t) of the limit value curve transmitter to the values of the current summated values $\Sigma \Delta n$, triggering of a measure for limiting the closing force and resetting of the time meter (28) and the sum memory (30) when the respective current value of the summated value $\Sigma \Delta n$ is equal to or greater than the respective current limit value g(t), and aborting of the comparison and resetting of the time meter (28) and the sum memory (30) when the respective current value of the summated value $\Sigma \Delta n$ is less than the respective current limit value $g_j(t)$ and remains constant within a preset tolerance $\Delta$ and a preset time $\Delta t$.

2. The method according to claim 1, characterized in that the determination of the respective current motor speeds n is carried out based on periodic edge alternations (16).

3. The method according to claim 1, characterized in that the difference between a current speed value $n_i$ and an immediately preceding speed value $n_{i-1}$ is calculated as the value that is typical for the change in motor speed $\Delta n$.

4. The method according to claim 1, characterized in that the progression of the limit values g(t) is interpolated from presettable, empirically determined corner points $g_i$.

5. The method according to claim 4, characterized in that the corner points $g_i$ are stored as a table in the limit value curve transmitter (30).

6. The method according to one of claim 1, characterized in that the limit value curve adapts to changing operating conditions.

7. The method according to claim 1, characterized in that the adjusting drive ( ) is stopped or reversed in order to limit the closing force.

* * * * *